Sept. 24, 1946. J. L. KELLOGG 2,408,260
PROCESS FOR MAKING COFFEE EXTRACTS
Filed Sept. 21, 1942 2 Sheets-Sheet 1
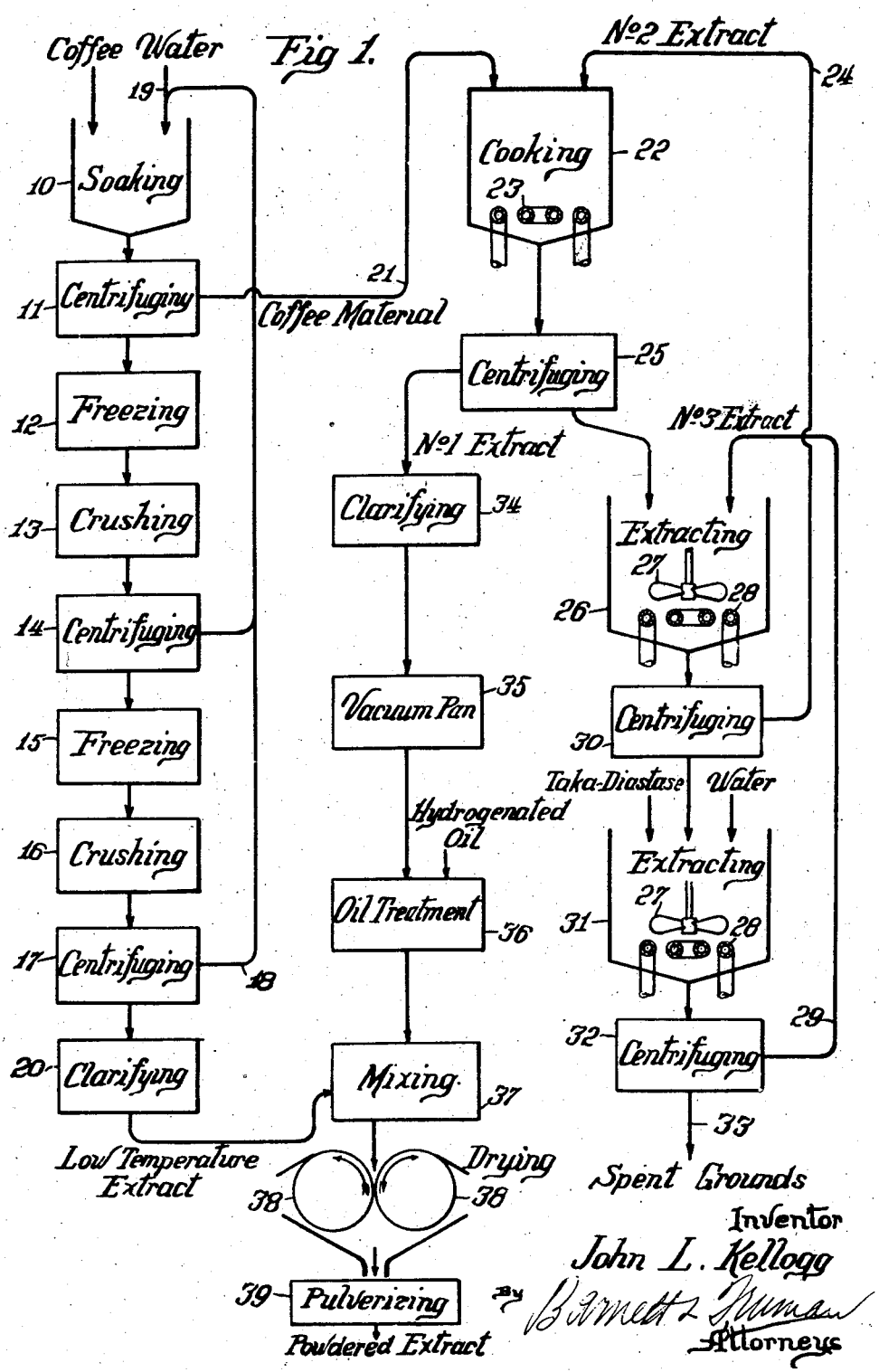

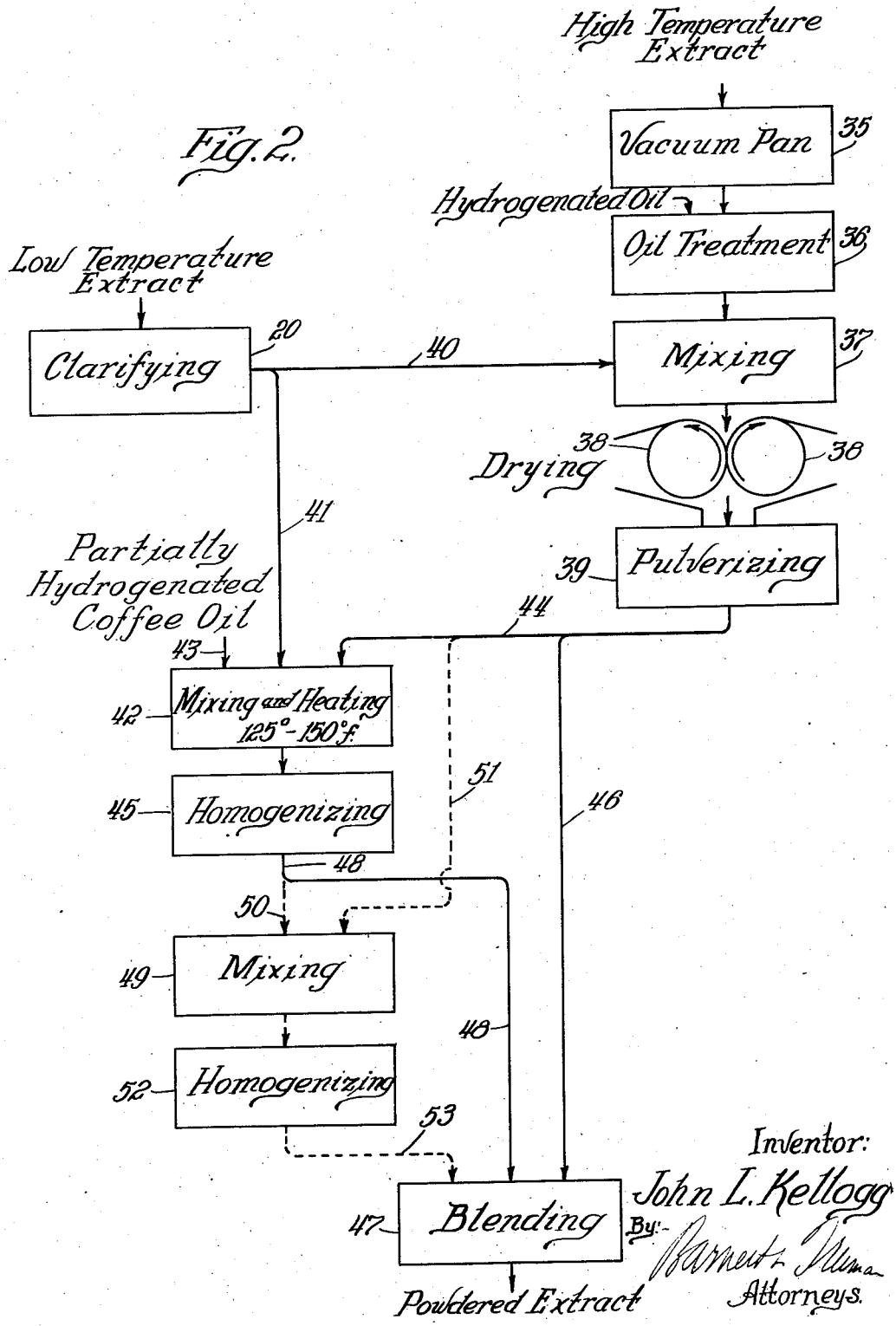

Patented Sept. 24, 1946

2,408,260

UNITED STATES PATENT OFFICE 2,408,260

PROCESS FOR MAKING COFFEE EXTRACTS

John L. Kellogg, Chicago, Ill., assignor to John L. Kellogg & Co., Chicago, Ill., a corporation of Illinois Application September 21, 1942, Serial No. 459,104

9 Claims. (Cl. 99—71)

This invention relates to the production of coffee extracts, in the form either of dry soluble powder or syrup; and a primary object of the invention is to provide certain novel procedures to be hereinafter described, whereby beverages made from the extracts will have, in a very high degree, the flavor and aroma of beverages made directly from the roasted and ground coffee beans.

A further object is to provide a process for making coffee extracts which will be efficient and economical; that is, which will remove from the coffee material, at a relatively low operating cost, a maximum amount of the desired extractable substances.

Coffee substances which give flavor and aroma to the beverages made from coffee extracts are in some cases easily volatilized and lost or their flavor and aroma giving qualities impaired if the material is subjected to high temperatures. For example, these substances may be lost or impaired by the prolonged heat treatments which the material may receive in extracting operations and in the subsequent concentration of the extract. The concentrating operations are usually carried out, in part or wholly, in a vacuum pan which is an economical procedure but one involving subjecting the extract at a relatively high temperature for a considerable period of time. In order to avoid the loss or impairment in quality of the flavor and aroma giving substances of the roasted coffee beans, the present invention contemplates the extraction of at least a portion of the extractives, and the subsequent concentration of the extract, at relatively low temperatures. For example, the concentration may be effected by freezing the extract. Preferably, however, only a part of the extractives are obtained and the extract concentrated in this manner. In the preferred form of the process, according to the present invention, an extract is made and concentrated at low temperature, the residue of the coffee material is subjected to extracting and concentrating operations at higher temperatures, and the two extracts are then combined. If the end product is to be a powder, the combined extracts may be dried between heated rolls, which involves, it is true, the subjecting of the material to relatively high temperatures but only momentarily, so that loss or impairment of aroma and flavor giving substances is at any rate minimized.

To further preserve and retain flavor and aroma giving substances, there is preferably mixed with the extract, particularly when a powdered extract is the ultimate product, a small quantity of a hydrogenated or partially hydrogenated vegetable oil, preferably coffee oil, the functions of which, at this stage of the process, are first to effect retention of coffee substances that would otherwise be volatilized, and second to prevent dust formation in the subsequent drying and pulverizing operations.

In application for United States patent filed by the applicant January 3, 1942, Serial No. 425,551, is described and claimed the expedient of adding to the coffee material in process, preferably to the powdered extract or the final syrup, in case the extract is not evaporated to dryness, a certain quantity of natural coffee oil mixed, preferably, with enough hydrogenated vegetable oil (which may be hydrogenated coffee oil) to prevent the natural coffee oil from becoming rancid. The present invention provides an improved process for incorporating the oil in the powder or syrup extract.

The process of the present invention also involves preferably the incorporation into the final extracted powder or syrup, of some at least of the low temperature extract, above referred to, together with the natural coffee oil, by a method which facilitates the introduction of these substances into the final product, with the result that the final product contains a relatively large quantity of flavor and aroma giving substances which have not been subjected to temperatures high enough to involve their loss by volatilization or impairment in respect to quality.

In applicant's United States Patent No. 2,282,138, patented May 5, 1942, for "Process for the production of soluble coffee extract," is disclosed an extracting process in which the coffee material is given successive extracting operations, with heat and agitation and in which the extracts move counter-current to the coffee material. In this patent there is also disclosed a cooking step in which the material before it enters the last extracting operation is cooked under steam pressure so as to make possible the removal of additional extractives in the extracting operation which follows—extractives which would not be removable by the usual extraction operation except for this cooking step. By this expedient the yield of extract is increased. It has been since discovered, however, that the cooking step, which does not involve agitation or but little agitation, is more advantageously used at the stage of the process from which is derived the final extract going to the vacuum pan, which will be referred to herein as the No. 1 extract, meaning the extract from the first treatment of the material in the countercurrent extracting system. By cooking the coffee material, which will preferably, as a matter of economy, be the material from which the preliminary or low temperature extract has been made as a last step in the extracting operation, a clearer extract is obtained than with the process of Patent No. 2,282,138, where three extracts, with agitation, are made after the material has been cooked. The cooking coagulates colloids which may then be removed by filtration or centrifuging and this brings about clarification of the extract.

The invention is exemplified in the following specific examples, which, however, should be regarded as typical and informative only and not as limiting the invention to the particulars given therein; the intention being to cover all equivalents of the process steps described and also all modifications of such processes within the scope of the hereto appended claims.

The drawings appended hereto are flow sheets illustrating the invention. Fig. 1 is a flow sheet illustrating the process described under the caption "Example 1"; and Fig. 2 illustrates a modification of this process described under the caption "Example 3."

*Example 1.*—Referring to flow sheet Fig. 1: 35 pounds of roasted and ground coffee is introduced into a vessel 10 with 10 gallons of fresh, cold water, that is, water at a temperature not in excess of room temperature (70° F.). The material is allowed to soak in vessel 10 for about 1 hour. It is then subjected to a separating operation, preferably by means of a centrifuge 11. The extract from centrifuge 11 is then frozen at 12, the ice crushed at 13, the crushed ice centrifuged at 14, the liquid frozen again at 15, the ice crushed at 16, and the crushed ice centrifuged at 17. The freezing, crushing and centrifuging operations may be repeated as often as desired in order to obtain as concentrated an extract as may be found necessary. The operations described will give an extract having a density of about 15° to 20° Baumé; although to obtain this density a third freezing operation may in some cases be necessary. The ice from centrifuges 14 and 17 is returned by line 18 to the fresh water supply 19 for the soaking vessel 10—the specified 10 gallons of fresh water including the water from the returned ice. The low temperature extract from the centrifuge 17 is preferably clarified in a clarifying centrifuge, or otherwise by filtration, and is mixed with the No. 1 extract produced by the counter-current extraction apparatus illustrated at the right-hand side of the flow sheet. This No. 1 extract may be referred to as the high temperature extract. The coffee material from centrifuge 11 goes through line 21 (fresh coffee may be added if desired—or fresh coffee used exclusively at this place) to the steam cooker 22 which is provided with a steam coil 23 or other suitable heating means. The coffee material entering the cooking vessel 22 through line 21 is mixed with No. 2 extract, entering the vessel through line 24, and the mixture is brought to a boil and boiled for about 5 minutes. The material is then centrifuged at 25, and the solid coffee material is introduced into the extracting vessel 26 which is provided with an agitator 27 and a steam coil 28. Here it is mixed with No. 3 extract through line 29 and maintained at a temperature of about 125° F. (120°–130°) for one hour, with agitation. The material is then centrifuged at 30, the liquid, extract No. 2, going through line 24 to the cooker 22, as described, and the solids to the extracting vessel 31, which is provided with agitator 27 and steam coil 28 and into which is introduced about 10 to 13 gallons of fresh water and about half ounce of taka-diastase in the powdered form. The extraction proceeds at a temperature of about 125° F. for one hour, with agitation; after which the material is centrifuged at 32, the liquid, extract No. 3, going through line 29 to the extracting vessel 26. The extraction at about 125° F. (120°–130° F.) is for the purpose of giving an optimum temperature for the action of taka-diastase. If other enzymes be used, the extraction temperature will preferably be the optimum temperature for such enzymes. The process may employ a larger number of extracting operations.

The No. 1 extract from centrifuge 25 is preferably clarified in the clarifying centrifuge 34, and is then introduced into the vacuum pan 35, operating, for example, at a vacuum of 28 inches of mercury, in which the extract is evaporated to a density of about 30°–32° Baumé. Preferably, and particularly if the extract is to be evaporated to dryness, there is added to the evaporated extract at 36 (or to the extract going to the vacuum pan 35) about one-half ounce of hydrogenated oil, which may be coffee oil or any hydrogenated vegetable oil, and which, in the amount used, does not affect the taste of the extract. The addition of the hydrogenated oil to the material in process is not covered generically herein, as it is disclosed and claimed in applicant's co-pending application Serial No. 375,542, filed January 21, 1941.

The low temperature extract from the freezing operation is mixed at 37 with the high temperature extract from the counter-current extracting system. This mixture may be packaged and sold as a liquid or semi-liquid extract, or may be further concentrated to a thick syrupy consistency; or it may be subjected to a drying operation, preferably of the instantaneous type. The drawings indicate, for this purpose, a pair of drying rolls 38, 38 into the bight of which is introduced the liquid from the mixture 37. The rolls will, of course, be provided with the usual doctor blades for scraping off the material, which material may then be reduced to a powder in the pulverizer 39. A single drying roll may be used, in which case the density of the extract mixture need not be quite as high as indicated. It will be possible, particularly under these conditions, to omit some or possibly all of the freezing operations. It will also be possible to use spray drying instead of drying upon a roll or rolls. The introduction of the oil at 36 brings about, when the material is subsequently dried, a coating or partial coating of the dry particles with the oil which helps to retain in the dried extract some flavor and aroma giving substances which might otherwise be volatilized and lost by the drying operation. The oil also, small in quantity as it is, tends to prevent dust formation in the pulverizing operation. Drying between rolls, or spray drying, is advantageous because, although temperatures may be high, the duration of heat application is very short. By employing the process as described, the final extract will contain extractives, of a more or less volatile character, derived from the low temperature extract, to compensate for the removal, destruction or deterioration of the corresponding constituents of the coffee material which occur, to some extent, as a consequence of the relatively high temperatures prevailing in the counter-current extracting system and also in the vacuum pan employed for evaporating or concentrating the extract from the counter-current extracting system. In this way, without sacrifice of yields, beverages made from the extract have the flavor and aroma of beverages made from roasted and ground coffee beans.

*Example 2.*—Instead of using fresh water in the preliminary low temperature extraction and concentrating the extract by freezing, it will be possible to omit the freezing operations and obtain an extract of sufficiently high density by using instead of fresh water for the preliminary soaking operation an extract from the counter-current extracting system. Or this expedient may be combined with the freezing process. In any case, a low temperature extract containing extractives, which are preserved because of the low temperature maintained in this part of the process, is mixed with the more concentrated extract obtained through the use of the relatively high temperatures so as to give the final extract mixture qualities and characteristics which the extract from the usual coffee extracting system does not have, or in which it is more or less deficient, because of the high temperatures to which the entire material is subjected in the extracting, concentrating and drying operations. The employment of diastase in connection with the extraction requires a temperature favorable to the enzymes, and at this temperature certain extractives are driven off or destroyed partially or wholly. This effect takes place to a greater extent in the vacuum pan. According to the present invention the deficiency of the high temperature extract, in respect to these extractives, is compensated for by the addition of the low temperature extract.

*Example 3.*—Fig. 2 illustrates a modification of the process as illustrated in Fig. 1, the purpose of which is to still further improve the flavor and aroma of the final extract, whether in the form of a syrup or a powder. In Fig. 2 the flow sheet illustrates the last steps of the process only. The steps preceding those illustrated may be the same as shown in Fig. 1. A part only of the low temperature extract from the clarifying centrifuge 20, goes through line 40 to the mixing vessel 37 which receives the high temperature extract from vacuum pan 35, either directly or, preferably, after oil treatment as indicated at 36. This mixture of extracts is dried on heated rolls as indicated at 38, and pulverized as indicated at 39. This part of the process is the same as in Fig. 1 (and the steps numbered the same) except that only part of the clarified liquor is so treated. The residue of the low temperature extract, clarified at 20, goes through line 41 to a mixing vessel 42 where it is mixed with coffee oil (preferably partially hydrogenated in order to prevent rancidity) introduced at 43, together with a small amount of pulverized coffee extract from the pulverizer 39—the device of Fig. 1—introduced at 44. The ingredients of the mixture may be as follows: Low temperature extract at 30° Baumé, 80 parts; dried and pulverized extract, 20 parts; coffee oil, 20 parts. About 20% to 40% of the coffee oil is hydrogenated, the rest being the natural coffee oil. In place of hydrogenated coffee oil, one can use any hydrogenated oil which is tasteless or substantially so. In place of the pulverized coffee extract, it is possible to use gum arabic or other suitable colloid, in proportion of ½% to 1% of the dry substance of the mixture in vessel 42. The mixture in vessel 42 is heated to about 125° F., but not in any case in excess of 150° F., and the material then treated to give a smooth emulsion. This may be accomplished by passing the mixture through a homogenizer 45 in which the mixture is forced through a small orifice at a pressure of 2500 pounds per square inch. Most of the extract pulverized at 39 passes through line 46 to a blending apparatus 47, which may be any suitable mixing device, into which is introduced through line 48 the emulsion from the homogenizing apparatus 45. The amount of the emulsion thus blended with the powdered extract may vary quite considerably, say from 0.5% to 5.0% by weight of the dry powder. In order to obtain a smooth emulsion of uniform consistency, it may be desirable to repeat the homogenizing operation, in which case, the emulsion from homogenizer 45 may be introduced into mixing vessel 49 through line 50 and there mixed with high temperature extract introduced through line 51, and the mixture put through a second homogenizer 52, and then introduced into the blending vessel 47 through line 53.

Applicant's co-pending application Serial No. 425,551 for "Coffee extract," filed January 3, 1942, describes and claims the mixing with the final coffee extract, whether in powdered or syrup form, a certain quantity of natural coffee oil for the purpose of improving the flavor and aroma characteristics of the product. The present invention involves, in respect to Example 3 (Fig. 2) an improved method of blending the oil with the extract whereby a smoother and more uniform blend is obtained.

It will be understood that the processes of Examples 1, 2 and 3 may be adapted, by obvious modifications, to the production of extract in the form of a syrup, instead of in the form of a dry powder. For example, the step of drying on the heated rolls may be omitted; or a concentrating operation, which does not reduce the material to a dry state, may be substituted for it. The introduction of the oil as an emulsion into the extract is, however, particularly desirable where the extract is in a powdered state. If oil is introduced into the final extract, the oil treatment of the high temperature extract at 36 may or may not be employed; but if employed, it will be possible to use any tasteless vegetable oil instead of coffee. In any case, enough of the oil introduced into the material, either at 36 or at 47, will be hydrogenated to prevent rancidity.

The present invention may be used to advantage in the production of so-called coffee substitutes, that is vegetable extracts from roasted wheat, rye, bran, malt, carmelized sugar, malt extract and molasses or other roasted vegetable matter used for producing extracts from which coffee-like beverages can be made. In such case a closer approximation to the flavor and aroma of coffee can be obtained by adding to the material, preferably to the dried and powdered extract a small amount of coffee oil and without a small amount of a hydrogenated vegetable oil described above in connection with the treatment of coffee extracts.

This application is a continuation-in-part of applicant's co-pending application for "Treatment of organic liquids," filed August 23, 1941, as Serial No. 408,052.

I claim:

1. Improvement in the process of making coffee extracts which comprises: subjecting roasted and ground coffee to a soaking operation in cold water; drawing off the liquid and subjecting the same to repeated freezing and separating operations, giving a low temperature concentrated extract; subjecting the coffee material to a boiling operation; drawing off the extract from the boiling operation; concentrating the same in a vacuum pan; mixing this high temperature extract with the low temperature extract from the freezing operations; subjecting the coffee material from the cooking operation to a series of extracting operations in counter-current with each other and with said cooking operation in which the more concentrated extract is introduced into the cooking operation; and subjecting the mixture of concentrated high temperature and low temperature extracts to a quick drying operation.

2. Process for the production of a beverage extract from roasted vegetable material which comprises: making a cold water extract from said material and concentrating the same at relatively low temperatures; making a hot water extract from the material, concentrating the hot water extract at higher temperatures than the first mentioned extract, combining both concentrated extracts, and drying the mixture quickly at relatively high temperatures.

3. Improvement in the process of making a concentrated beverage extract from roasted vegetable material which comprises: blending with the concentrated extract a homogenized water emulsion of natural coffee oil.

4. Improvement in the process of making coffee extract which comprises: making an extract from ground roasted coffee blending with the extract a homogenized water emulsion of natural coffee oil.

5. Process of making coffee extract which comprises: extracting a portion of the solubles from the coffee material and concentrating the extract, at relatively low temperatures; extracting another portion of the solubles from the coffee material and concentrating the extract at relatively high temperatures making a mixture of said concentrated extracts; quickly drying the combined extracts at relatively high temperatures; and blending with the dry extract some of the concentrated low temperature extract.

6. Process of making coffee extract which comprises: extracting a portion of the solubles from the coffee material and concentrating the extract, at relatively low temperatures; extracting another portion of the solubles from the coffee material and concentrating the extract at relatively high temperatures making a mixture of said extracts; evaporating the combined extracts to a dry state; and blending with the dry extract an emulsion containing some of said low temperature extract and natural coffee oil.

7. Process of making coffee extract which comprises: extracting a portion of the solubles from the coffee material and concentrating the extract, at relatively low temperatures; extracting another portion of the solubles from the coffee material and concentrating the extract at relatively high temperatures, making a mixture of said low temperature and high temperature extracts; evaporating the combined extracts to a dry state; and blending with the dry extract an emulsion containing some of said low temperature extract natural coffee oil and some of said dry extract.

8. Process of making coffee extract which comprises: extracting a portion of the solubles from the coffee material and concentrating the extract, at relatively low temperatures; extracting another portion of the solubles from the coffee material and concentrating the extract at relatively high temperatures making a mixture of said extracts; evaporating the combined extracts to a dry state; homogenizing a mixture of some of said low temperature extract, natural coffee oil and some of the dry extract to form a smooth and uniform emulsion; and blending said emulsion with the rest of the dry extract.

9. In the process of making dry coffee extract which includes making a concentrated liquid extract and thereafter drying the same by application of heat, the improvement comprising introducing into the liquid extract immediately before the drying a small amount of vegetable oil to preserve the volatile flavor giving constituents of the extract and to prevent formation of dust during the said drying step of the process.

JOHN L. KELLOGG.